(12) United States Patent
Tachibana

(10) Patent No.: US 10,886,060 B2
(45) Date of Patent: Jan. 5, 2021

(54) MULTILAYER ELECTRONIC COMPONENT MANUFACTURING METHOD AND MULTILAYER ELECTRONIC COMPONENT

(71) Applicant: Murata Manufacturing Co., Ltd., Kyoto-fu (JP)

(72) Inventor: Kaoru Tachibana, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 15/840,777

(22) Filed: Dec. 13, 2017

(65) Prior Publication Data

US 2018/0182535 A1 Jun. 28, 2018

(30) Foreign Application Priority Data

Dec. 28, 2016 (JP) .................. 2016-255952

(51) Int. Cl.
| | |
|---|---|
| *H01F 5/00* | (2006.01) |
| *H01F 27/29* | (2006.01) |
| *H01F 27/245* | (2006.01) |
| *H01F 27/28* | (2006.01) |
| *H01F 41/04* | (2006.01) |
| *H01F 17/00* | (2006.01) |

(Continued)

(52) U.S. Cl.
CPC ......... *H01F 27/29* (2013.01); *H01F 17/0013* (2013.01); *H01F 27/245* (2013.01); *H01F 27/2804* (2013.01); *H01F 41/041* (2013.01); *H01C 1/14* (2013.01); *H01C 17/006* (2013.01); *H01F 2027/2809* (2013.01); *H01G 4/12* (2013.01); *H01G 4/228* (2013.01); *H01G 4/30* (2013.01)

(58) Field of Classification Search
USPC ........................................... 336/200
See application file for complete search history.

(56) References Cited

U.S. PATENT DOCUMENTS 5,598,135 A * 1/1997 Maeda ................ H01F 17/0013
 336/200
6,154,114 A 11/2000 Takahashi
(Continued)

FOREIGN PATENT DOCUMENTS

| | | |
|---|---|---|
| JP | S62-33401 A | 2/1987 |
| JP | H6-112100 A | 4/1994 |

(Continued)

OTHER PUBLICATIONS

English translation of JP2003110397 (Year: 2003).*
(Continued)

*Primary Examiner* — Ronald Hinson
(74) *Attorney, Agent, or Firm* — Studebaker & Brackett PC

(57) ABSTRACT

A multilayer electronic component manufacturing method includes forming a multilayer body including a plurality of ceramic layers, and forming an outer electrode conductor layer on a bottom surface of the multilayer body. The method further includes forming a groove by removing at least a part of the outer electrode conductor layer in a part of the outer electrode conductor layer and a part of the bottom surface of the multilayer body after the outer electrode conductor layer is formed, and segmenting the multilayer body by dividing the multilayer body into a plurality of chip regions.

10 Claims, 8 Drawing Sheets

(51) Int. Cl.
    *H01G 4/12*     (2006.01)
    *H01C 1/14*     (2006.01)
    *H01C 17/00*    (2006.01)
    *H01G 4/30*     (2006.01)
    *H01G 4/228*    (2006.01)

(56) References Cited

U.S. PATENT DOCUMENTS

| 8,593,247 | B2* | 11/2013 | Jeong | H01F 27/292 |
|---|---|---|---|---|
| | | | | 336/115 |
| 2010/0090790 | A1* | 4/2010 | Azuma | H01F 17/04 |
| | | | | 336/192 |
| 2011/0285494 | A1* | 11/2011 | Jeong | H01F 17/0013 |
| | | | | 336/200 |

FOREIGN PATENT DOCUMENTS

| JP | H6-163305 A | 6/1994 |
|---|---|---|
| JP | H9-186042 A | 7/1997 |
| JP | 2000-509554 A | 7/2000 |
| JP | 2001035737 A | 2/2001 |
| JP | 3351738 B2 | 12/2002 |
| JP | 2005-101038 A | 4/2005 |
| JP | 2006-130724 A | 5/2006 |
| JP | 2007-180428 A | 7/2007 |
| JP | 2010-238991 A | 10/2010 |
| JP | 2012-235112 A | 11/2012 |
| JP | 2012-244057 A | 12/2012 |
| JP | 2013-106030 A | 5/2013 |
| JP | 2015-023262 A | 2/2015 |
| JP | 2015-23275 A | 2/2015 |
| JP | 2018-107411 A | 7/2018 |

OTHER PUBLICATIONS

An Office Action; "Notification of Reasons for Refusal," Mailed by the Japanese Patent Office dated Nov. 27, 2018, which corresponds to Japanese Patent Application No. 2016-255952 and is related to U.S. Appl. No. 15/840,777; with English language translation.

An Office Action; "Notification of Reasons for Refusal," Mailed by the Japanese Patent Office dated Jun. 18, 2019, which corresponds to Japanese Patent Application No. 2016-255952 and is related to U.S. Appl. No. 15/840,777; with English language translation.

An Office Action mailed by the State Intellectual Property Office of the People's Republic of China dated Jul. 26, 2019, which corresponds to Chinese Patent Application No. 201711431276.5 and is related to U.S. Appl. No. 15/840,777 with English language translation.

An Office Action issued by the China National Intellectual Property Administration dated Sep. 17, 2020, which corresponds to Chinese Patent Application No. 201711431276.5 and is related to U.S. Appl. No. 15/840,777 with English language translation.

* cited by examiner

MULTILAYER ELECTRONIC COMPONENT MANUFACTURING METHOD AND MULTILAYER ELECTRONIC COMPONENT

CROSS-REFERENCE TO RELATED APPLICATION

This application claims benefit of priority to Japanese Patent Application No. 2016-255952, filed Dec. 28, 2016, the entire content of which is incorporated herein by reference.

BACKGROUND

Technical Field

The present disclosure relates to a multilayer electronic component manufacturing method and a multilayer electronic component

Description of the Related Art

An existing multilayer electronic component has been disclosed in Japanese Patent No. 3351738. The multilayer electronic component includes a multilayer body, a coil that is provided in the multilayer body, and an outer electrode that is provided on the multilayer body and is electrically connected to the coil. In order to suppress stray capacitance that is generated between the outer electrode and the coil, the outer electrode having a predetermined shape is provided on a part of the bottom surface of the multilayer body.

When the existing multilayer electronic component is tried to be manufactured, it is considered that, in formation of the outer electrode, the upper surface side of the multilayer body is held and the outer electrode is formed by a dip method. The dip method is the easiest method with low cost. The dip method however has the problem that it is difficult to form the outer electrode having high dimensional accuracy on the part of the bottom surface of the multilayer body.

SUMMARY

Accordingly, the present disclosure provides a multilayer electronic component manufacturing method and a multilayer electronic component that enable an outer electrode having high dimensional accuracy to be formed on the bottom surface of a multilayer body at low cost.

A multilayer electronic component manufacturing method according to a preferred embodiment of the present disclosure includes forming a multilayer body including a plurality of ceramic layers; forming an outer electrode conductor layer on a bottom surface of the multilayer body; forming a groove by removing at least a part of the outer electrode conductor layer in a part of the outer electrode conductor layer and a part of the bottom surface of the multilayer body after the outer electrode conductor layer is formed; and segmenting the multilayer body by dividing the multilayer body into a plurality of chip regions.

With the multilayer electronic component manufacturing method in the preferred embodiment of the present disclosure, the groove is formed by removing at least a part of the outer electrode conductor layer in a part of the outer electrode conductor layer and a part of the bottom surface of the multilayer body, the multilayer body is segmented by being divided into the plurality of chip regions. Therefore, the outer electrode having a predetermined shape can be formed. Accordingly, the outer electrode having high dimensional accuracy can be formed on the bottom surface of the multilayer body at low cost.

In one embodiment of the multilayer electronic component manufacturing method, in the forming of the groove, the groove can be easily formed using a dicer blade.

In another embodiment of the multilayer electronic component manufacturing method, in the segmenting, the multilayer body is segmented using a dicer blade. With this embodiment, in the segmenting, the dicer blade that is the same as or similar to that used in the forming of the groove can be used, thereby simplifying manufacturing.

In still another embodiment of the multilayer electronic component manufacturing method, the dicer blade that is used in the forming of the groove and the dicer blade that is used in the segmenting simultaneously perform scanning. Therefore, a manufacturing period of time can be reduced.

In still another embodiment of the multilayer electronic component manufacturing method, the forming of the groove is performed before the segmenting. Therefore, the groove can be formed while the multilayer body is held in a stable state and the groove can be formed at an accurate position.

In still another embodiment of the multilayer electronic component manufacturing method, in the forming of the groove, the groove is formed by removing a part of the outer electrode conductor layer and a part of the bottom surface of the multilayer body. Accordingly, when the multilayer electronic component is mounted on a mounting substrate, if the outer electrode of the multilayer electronic component is bonded to the mounting substrate by solder, the solder can wet up an inner surface of the groove. Bonding strength of the multilayer electronic component is thereby improved to make a posture of the multilayer electronic component stable.

In still another embodiment of the multilayer electronic component manufacturing method, a scanning direction of the dicer blade that is used in the segmenting includes two directions, and one direction of the two directions is the same direction as a scanning direction of the dicer blade that is used in the forming of the groove. Therefore, segmentation and formation of the groove can be performed without changing an orientation of the multilayer body.

In still another embodiment of the multilayer electronic component manufacturing method, the dicer blade that is used in the forming of the groove and the dicer blade that is used in the segmenting are positioned with reference to common marks provided on the multilayer body for scanning. Accordingly, with this embodiment, in the forming of the groove and the segmenting, dicer cutting is performed using the common cut marks. Therefore, cutting positions can be easily adjusted.

In still another embodiment of the multilayer electronic component manufacturing method, in the segmenting, the multilayer body is divided to form a divided surface on the multilayer body. The method includes forming a cutout groove in a corner portion at which the bottom surface of the multilayer body and the divided surface of the multilayer body intersect with each other after the forming of the outer electrode conductor layer. With this embodiment, a multilayer electronic component in which the cutout groove is formed in the corner portion at which the bottom surface of the multilayer body and the outer surface (divided surface) of the multilayer body intersect with each other can be manufactured. Accordingly, when the multilayer electronic component is mounted on a mounting substrate, if the outer electrode of the multilayer electronic component is bonded to the mounting substrate by solder, the solder wets up the cutout groove and the solder that protrudes to an outer side portion relative to the outer surface of the multilayer body can be reduced. With this configuration, the mounting area of the multilayer electronic component can be reduced.

In still another embodiment of the multilayer electronic component manufacturing method, a width W2 of the dicer blade that is used in the segmenting is smaller than a width W1 of the dicer blade that is used in the forming of the groove. Therefore, the width of segmentation can be decreased, thereby improving a yield.

In still another embodiment of the multilayer electronic component manufacturing method, a width W1 of the dicer blade that is used in the forming of the groove and a width W2 of the dicer blade that is used in the segmenting are the same. Therefore, the dicer blade can be commonly used in the forming of the groove and the segmenting.

A multilayer electronic component according to another preferred embodiment of the disclosure includes a multilayer body including a plurality of ceramic layers, and an outer electrode provided on the multilayer body, wherein a groove is provided in a bottom surface of the multilayer body, and the outer electrode is provided on the bottom surface of the multilayer body. With this embodiment, the outer electrode is provided on the bottom surface of the multilayer body. Therefore, when the multilayer electronic component is mounted on a mounting substrate, if the outer electrode of the multilayer electronic component is bonded to the mounting substrate by solder, the solder wets up an inner surface of the groove and bonding strength of the multilayer electronic component is improved to make a posture of the multilayer electronic component stable.

In an embodiment of the multilayer electronic component, an inner surface of the groove has a bottom surface, side surfaces, and connection portions that are formed into recessed curved surfaces between the bottom surface and the side surfaces. Therefore, stress concentration on the connection portions is dispersed to improve strength.

In another embodiment of the multilayer electronic component, the multilayer body has a plurality of coil patterns provided between the plurality of ceramic layers, and the plurality of coil patterns are electrically connected to each other to configure a spiral coil. With this embodiment, the multilayer electronic component can be applied to an inductor component.

In still another embodiment of the multilayer electronic component, a lamination direction of the plurality of ceramic layers is a direction that is orthogonal to the bottom surface of the multilayer body, and an axis of the spiral coil is orthogonal to the bottom surface of the multilayer body. With this embodiment, the multilayer electronic component can be applied to a so-called, vertically laminated and vertically wound inductor component.

In still another embodiment of the multilayer electronic component, a lamination direction of the plurality of ceramic layers is a direction that is orthogonal to the bottom surface of the multilayer body, and an axis of the spiral coil is in parallel with the bottom surface of the multilayer body. With this embodiment, the multilayer electronic component can be applied to a so-called, vertically laminated and horizontally wound inductor component.

In still another embodiment of the multilayer electronic component, a cutout groove is provided in a corner portion at which the bottom surface of the multilayer body and an outer surface of the multilayer body intersect with each other. With this embodiment, when the multilayer electronic component is mounted on a mounting substrate, if the outer electrode of the multilayer electronic component is bonded to the mounting substrate by solder, the solder wets up the cutout groove and the solder that protrudes to an outer side portion relative to the outer surface of the multilayer body can be reduced. With this configuration, the mounting area of the multilayer electronic component can be reduced.

In still another embodiment of the multilayer electronic component, the bottom surface of the groove has a plurality of recess portions extending along an extension direction of the groove. With this embodiment, when the multilayer electronic component is manufactured, the groove can be formed by forming the plurality of recess portions with a dicer blade while the width of the dicer blade that is used for forming the groove is made smaller than the width of the groove. Accordingly, the dicer blade having a small width can be used.

Other features, elements, characteristics and advantages of the present disclosure will become more apparent from the following detailed description of preferred embodiments of the present disclosure with reference to the attached drawings.

DETAILED DESCRIPTION

Figure 1:
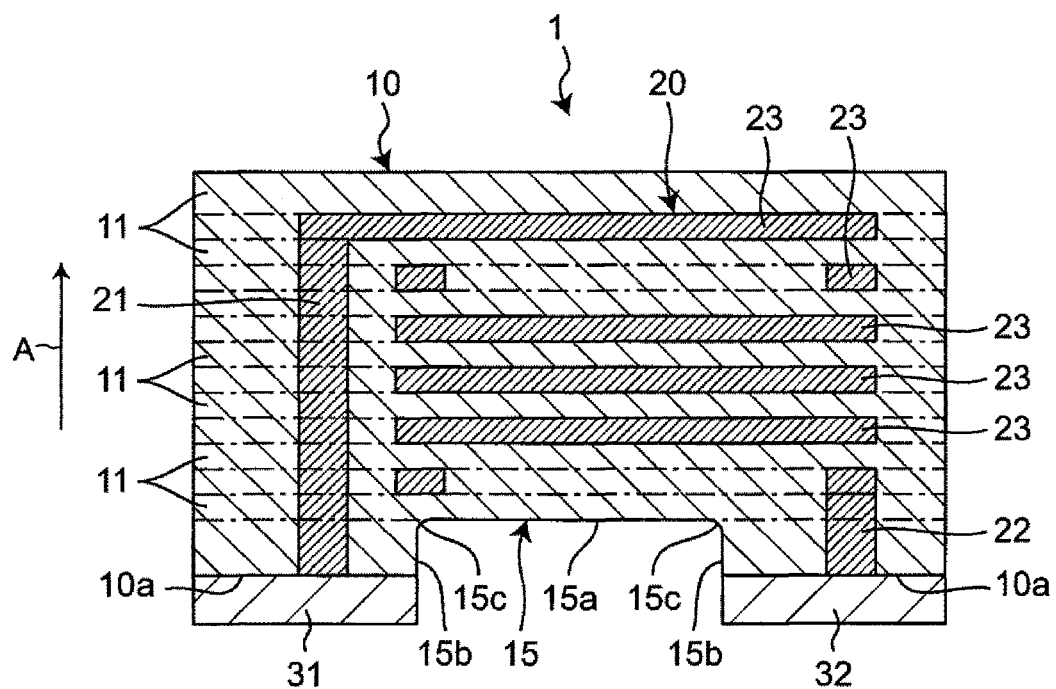
FIG. 1 is a cross-sectional view illustrating a first embodiment of a multilayer electronic component according to the present disclosure.

Hereinafter, the present disclosure will be described more in detail using embodiments in the drawings.

First Embodiment

FIG. 1 is a cross-sectional view illustrating a first embodiment of a multilayer electronic component according to the present disclosure. As illustrated in FIG. 1, a multilayer electronic component 1 includes a multilayer body 10 and outer electrodes 31 and 32 provided on the multilayer body 10. The multilayer body 10 includes therein a spiral coil 20. The outer electrodes 31 and 32 are electrically connected to the coil 20. The multilayer electronic component 1 is an inductor component.

The multilayer electronic component 1 is electrically connected to wirings of a circuit substrate (not illustrated) with the outer electrodes 31 and 32. The multilayer electronic component 1 is used as, for example, a noise removal filter, and is used for electronic apparatuses such as a personal computer, a DVD (digital versatile disk) player, a digital camera, a TV (television), a cellular phone, and an automotive electronic device.

The multilayer body 10 is configured by laminating a plurality of ceramic layers 11. The ceramic layers 11 are made of, for example, a magnetic material such as ferrite. The multilayer body 10 is formed to have a substantially rectangular parallelepiped shape. A lamination direction A of the plurality of ceramic layers 11 is a direction that is orthogonal to a bottom surface 10a of the multilayer body 10. The bottom surface 10a of the multilayer body 10 is a surface with which the multilayer electronic component 1 is mounted on a mounting substrate. In FIG. 1, a direction from the front side of a paper plane toward the back side is a width direction of the multilayer body 10 and a right-left direction of the paper plane is a lengthwise direction of the multilayer body 10.

A groove 15 is provided in the bottom surface 10a of the multilayer body 10. The groove 15 extends in the width direction of the multilayer body 10 and is provided at a center portion of the multilayer body 10 in the lengthwise direction. The bottom surface 10a is divided into both sides of the width direction with the groove 15 interposed therebetween. In other words, the multilayer body 10 includes a leg portion at each of the sides of the width direction.

The inner surface of the groove 15 has a bottom surface 15a, side surfaces 15b, and connection portions 15c between the bottom surface 15a and the side surfaces 15b. The inner surface of the groove 15 is formed to have a substantially rectangular shape. The bottom surface 15a and the side surfaces 15b are respectively formed to be substantially flat. The connection portions 15c are formed into recessed curved surfaces. With the connection portions 15c formed into the recessed curved surfaces, stress concentration on the connection portions 15c is dispersed to improve strength.

The outer electrodes 31 and 32 are provided on the bottom surface 10a of the multilayer body 10. That is to say, the first outer electrode 31 is provided on the bottom surface 10a (leg portion) at one side of the width direction and the second outer electrode 32 is provided on the bottom surface 10a (leg portion) at the other side of the width direction.

The coil 20 includes a plurality of coil patterns 23 provided between the plurality of ceramic layers 11. The plurality of coil patterns 23 are electrically connected to each other with via conductors (not illustrated) interposed therebetween to configure the spiral coil 20. An axis of the coil 20 is orthogonal to the bottom surface 10a and is identical to the lamination direction of the ceramic layers 11. That is to say, the multilayer electronic component 1 is a so-called, vertically laminated and vertically wound inductor component.

A first extended conductor 21 and a second extended conductor 22 are respectively provided at both ends of the coil 20. The first extended conductor 21 is exposed from the bottom surface 10a at one side of the width direction and makes contact with the first outer electrode 31. The second extended conductor 22 is exposed from the bottom surface 10a at the other side of the width direction and makes contact with the second outer electrode 32.

With the multilayer electronic component 1, the outer electrodes 31 and 32 are provided on the bottom surface 10a of the multilayer body 10. Therefore, when the multilayer electronic component 1 is mounted on a mounting substrate (not illustrated), if the outer electrodes 31 and 32 of the multilayer electronic component 1 are bonded to the mounting substrate by solder, the solder wets up the inner surface of the grooves 15 and bonding strength of the multilayer electronic component 1 is improved to make a posture of the multilayer electronic component 1 stable.

Next, a method for manufacturing the multilayer electronic component 1 will be described.

Figure 2A:
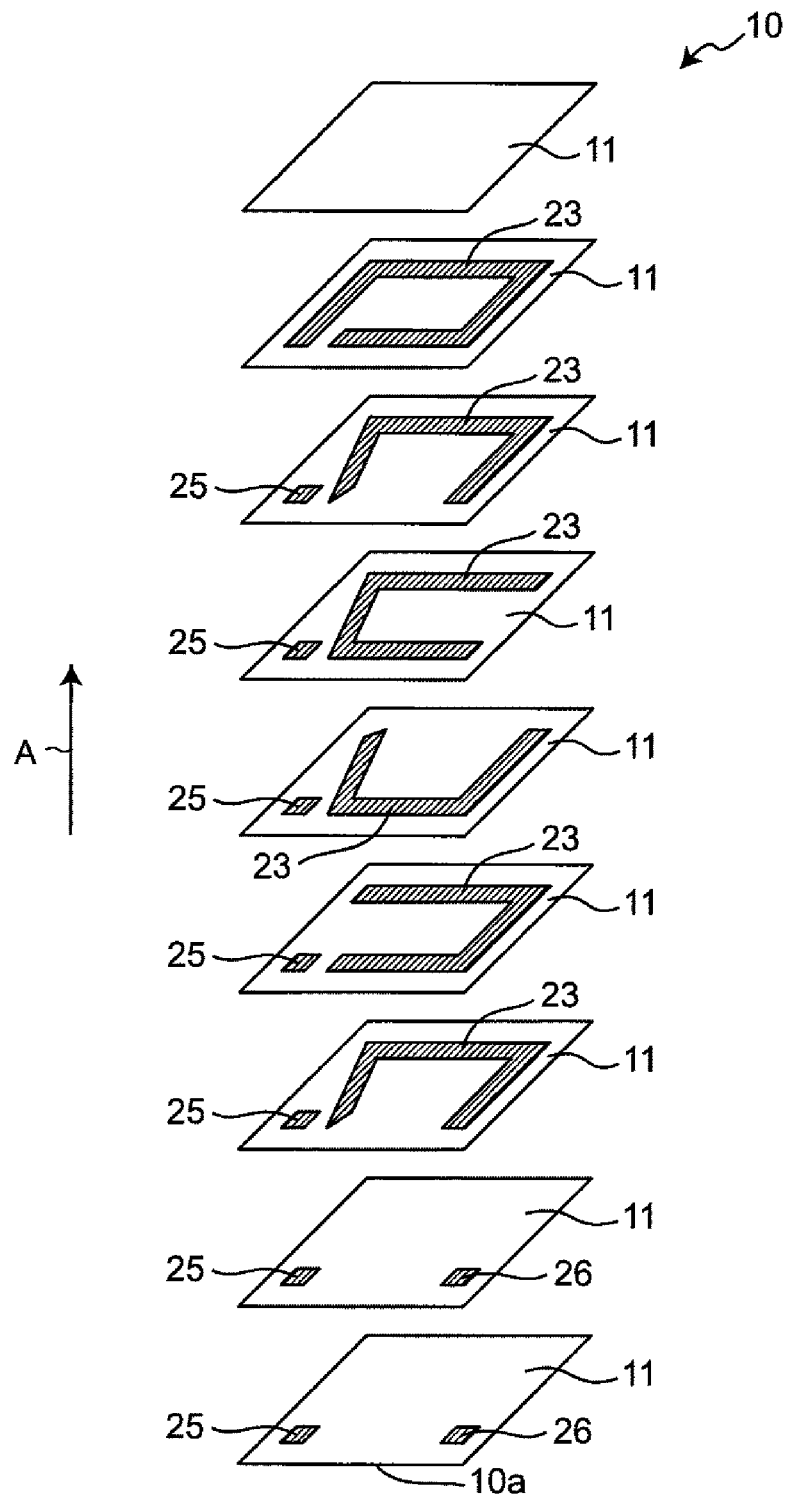
FIG. 2A is a perspective view illustrating the first embodiment of a multilayer electronic component manufacturing method in the present disclosure.

As illustrated in FIG. 2A, the multilayer body 10 including the plurality of ceramic layers 11 is formed. As is described in detail, the coil patterns 23 are formed on green sheets forming the predetermined ceramic layers 11 using screen printing or the like. Furthermore, through-holes are formed in green sheets forming the predetermined ceramic layers 11 using laser or the like and first extended conductor layers 25 and second extended conductor layers 26 are formed in the through-holes together with the coil patterns 23. The first extended conductor layers 25 configure the first extended conductor 21 and the second extended conductor layers 26 configure the second extended conductor 22. In FIG. 2A, the coil patterns 23, the first extended conductor layers 25, and the second extended conductor layers 26 are hatched for illustration.

Then, all of the green sheets forming the ceramic layers 11 are laminated in the lamination direction A and are pressure-bonded to form the multilayer body 10 that is unbaked. In FIG. 2A, the bottom surface 10a of the multilayer body 10 is located at the lower side for illustration. Although FIG. 2A illustrates only a single chip for facilitating understanding, in practice, the single chips are arranged in a manner adjacent to one another to configure a plurality of chips as illustrated in FIG. 2B.

Figure 2B:
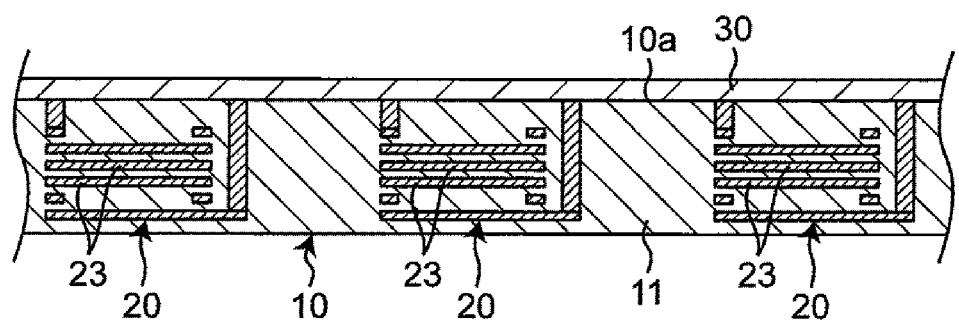
FIG. 2B is a cross-sectional view illustrating the first embodiment of the multilayer electronic component manufacturing method in the present disclosure.

Thereafter, as illustrated in FIG. 2B, an outer electrode conductor layer 30 is formed on the bottom surface 10a of the multilayer body 10 using screen printing or the like. The outer electrode conductor layer 30 configures the outer electrodes 31 and 32. Although the outer electrode conductor layer 30 is applied to the bottom surface 10a overall, it may be applied to a part of the bottom surface 10a. In FIG. 2B, the bottom surface 10a of the multilayer body 10 is located at the upper side for illustration.

Figure 2C:
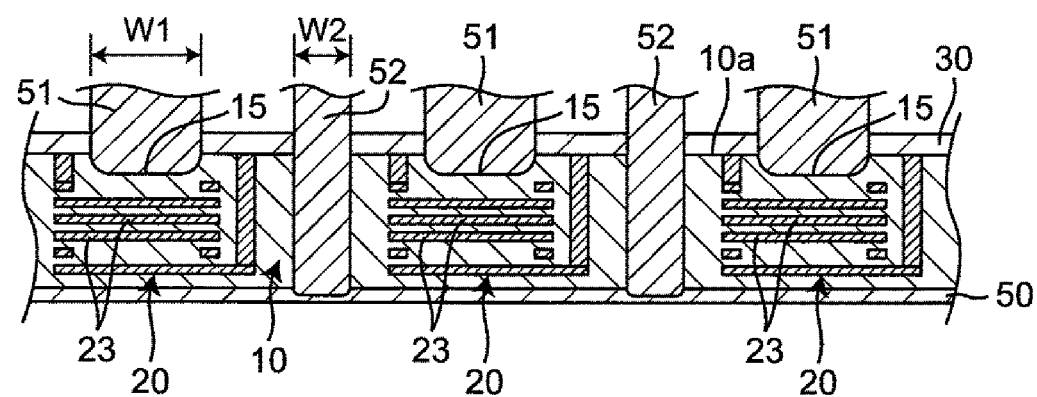
FIG. 2C is a cross-sectional view illustrating the first embodiment of the multilayer electronic component manufacturing method in the present disclosure.

Thereafter, as illustrated in FIG. 2C, after the outer electrode conductor layer 30 is formed, the grooves 15 are formed by removing some parts of the outer electrode conductor layer 30 and some parts of the bottom surface 10a of the multilayer body 10 (hereinafter, referred to as a groove formation process). That is to say, the grooves 15 are continuously provided in some parts of the outer electrode conductor layer 30 and some parts of the bottom surface 10a of the multilayer body 10, which are located just under some parts of the outer electrode conductor layer 30. Furthermore, the multilayer body 10 is segmented by being divided into a plurality of chip regions (hereinafter, referred to as a segmentation process). With these processes, as illustrated in a plan view of FIG. 2D, the plurality of multilayer electronic components 1 including the outer electrodes 31 and 32 of predetermined shapes are formed.

As is described in detail, a holding sheet 50 is bonded to the surface of the multilayer body 10 at the opposite side to the bottom surface 10a and fixes the plurality of chips so as to prevent them from scattering when the multilayer body 10 is segmented into the plurality of chips. The holding sheet 50 is removed in, for example, a baking process, which will be described later.

Then, in the groove formation process, the grooves 15 are formed using groove dicer blades 51. In the segmentation process, the multilayer body 10 is segmented using segmentation dicer blades 52. A width W2 of the segmentation dicer blades 52 is smaller than a width W1 of the groove dicer blades 51. The groove dicer blades 51 and the segmentation dicer blades 52 simultaneously perform scanning. Regions removed by the segmentation dicer blades 52 are assumed to removal regions Z1 and Z2 in FIG. 2D.

In this case, the scanning direction of the segmentation dicer blades 52 includes two directions along the bottom surface 10a of the multilayer body 10. In the embodiment, the two directions are the width direction W and the lengthwise direction L of the multilayer body 10 of each multilayer electronic component 1. The first removal regions Z1 are formed by scanning in the width direction W by the segmentation dicer blades 52. The second removal regions Z2 are formed by scanning in the lengthwise direction L by the segmentation dicer blades 52.

The width direction W as one of the two scanning directions of the segmentation dicer blades 52 is the same direction as the scanning direction of the groove dicer blades 51. That is to say, the segmentation dicer blades 52 perform scanning in the width direction W whereas the groove dicer blades 51 perform scanning in the width direction W. With this scanning manner, formation of the grooves and the segmentation can be performed without changing an orientation of the multilayer body 10. After the segmentation dicer blades 52 perform scanning in the width direction W, they perform scanning in the lengthwise direction L. Alternatively, after the segmentation dicer blades 52 perform scanning in the lengthwise direction L, they may perform scanning in the width direction W.

In the groove formation process and the segmentation process, the groove dicer blades 51 and the segmentation dicer blades 52 may be positioned with reference to common cut marks provided on the multilayer body for scanning. Cutting positions can therefore be easily adjusted. The cut marks are formed on the bottom surface of the multilayer body using, for example, screen printing or the like. This formation manner enables the cut marks to be easily recognized. It should be noted that the cut marks may be formed on the side surfaces of the multilayer body or in the multilayer body.

Thereafter, the plurality of segmented chips are baked to manufacture the plurality of multilayer electronic components 1. It should be noted that the baking process may be performed before the groove formation process and the segmentation process.

Figure 2D:
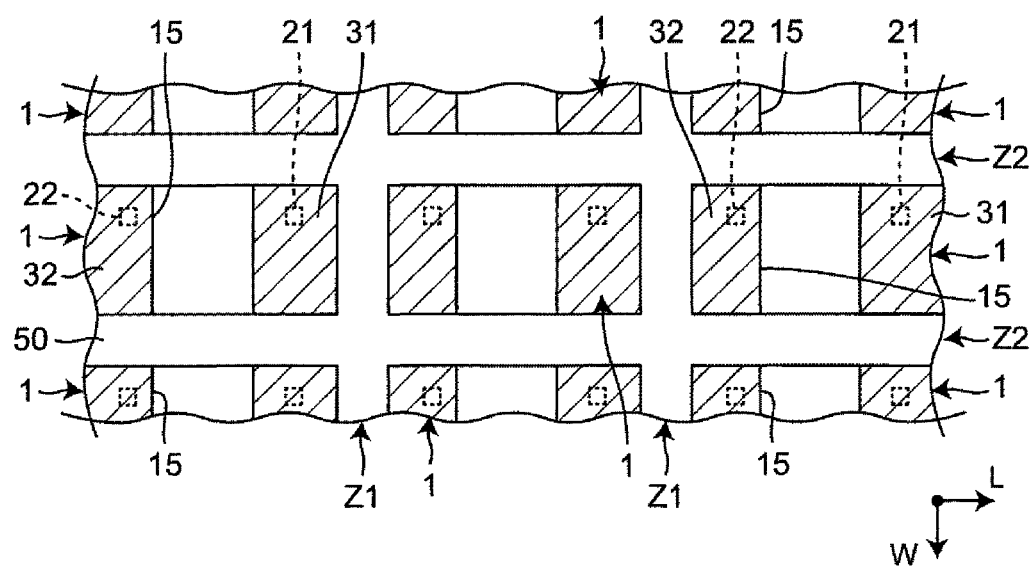
FIG. 2D is a plan view illustrating the first embodiment of the multilayer electronic component manufacturing method in the present disclosure.

With the method for manufacturing the multilayer electronic component 1, the grooves 15 are formed by removing some parts of the outer electrode conductor layer 30 and some parts of the bottom surface 10a of the multilayer body 10, and the multilayer body 10 is segmented by being divided into the plurality of chip regions. Therefore, the formation of the grooves 15 and the segmentation can be easily performed accurately and the outer electrodes 31 and 32 having the predetermined shapes can be formed. In FIG. 2D, the outer electrodes 31 and 32 are hatched for illustration. Accordingly, the outer electrodes 31 and 32 having high dimensional accuracy can be formed on the bottom surfaces 10a of the multilayer bodies 10 at low cost.

The grooves 15 are formed by removing some parts of the bottom surface 10a of the multilayer body 10. Therefore, when each multilayer electronic component 1 is mounted on the mounting substrate, if the outer electrodes 31 and 32 of the multilayer electronic component 1 are bonded to the mounting substrate by the solder, the solder can wet up the inner surface of the groove 15 of the multilayer body 10. The bonding strength of the multilayer electronic component 1 is therefore improved to make the posture of the multilayer electronic component 1 stable.

In the groove formation process, the grooves 15 are formed using the groove dicer blades 51. Therefore, the grooves 15 can be easily formed. In the segmentation process, the multilayer body 10 is segmented using the segmentation dicer blades 52. This enables the dicer blades that are the same as or similar to those used in the groove formation process to be used, thereby simplifying manufacturing.

The groove dicer blades 51 and the segmentation dicer blades 52 simultaneously perform scanning and a manufacturing period of time can therefore be reduced. Furthermore, the width W2 of the segmentation dicer blades is smaller than the width W1 of the groove dicer blades. Therefore, the width of the segmentation can be decreased, thereby improving a yield.

The groove formation process may be performed before the segmentation process. In this case, the grooves can be formed while the multilayer body is held in a stable state and the grooves can be formed at accurate positions. Alternatively, the groove formation process may be performed after the segmentation process.

The scanning direction of the segmentation dicer blades may include two directions along the bottom surface of the multilayer body. In this case, one direction of the two directions is the same direction as the scanning direction of the dicer blades that are used in the groove formation process. The two directions may not be orthogonal to each other.

The groove dicer blades and the segmentation dicer blades may be provided so as to correspond to all of the grooves and the removal regions or at least one pair of the groove dicer blade and the segmentation dicer blade may be provided and moved in turn. In the segmentation process, the segmentation may be performed using hand push processing.

The multilayer electronic component may be applied to a so-called, vertically laminated and horizontally wound inductor component. As is described in detail, the lamination direction of the plurality of ceramic layers is a direction that is orthogonal to the bottom surface and an axis of the spiral coil is in parallel with the bottom surface. The vertically laminated and horizontally wound inductor component is disclosed in, for example, Japanese Unexamined Patent Application Publication No. 2006-130724. Furthermore, the outer electrode conductor layer may be applied to the bottom surface of the multilayer body for formation using not the screen printing but a dip method.

Second Embodiment

Figure 3:
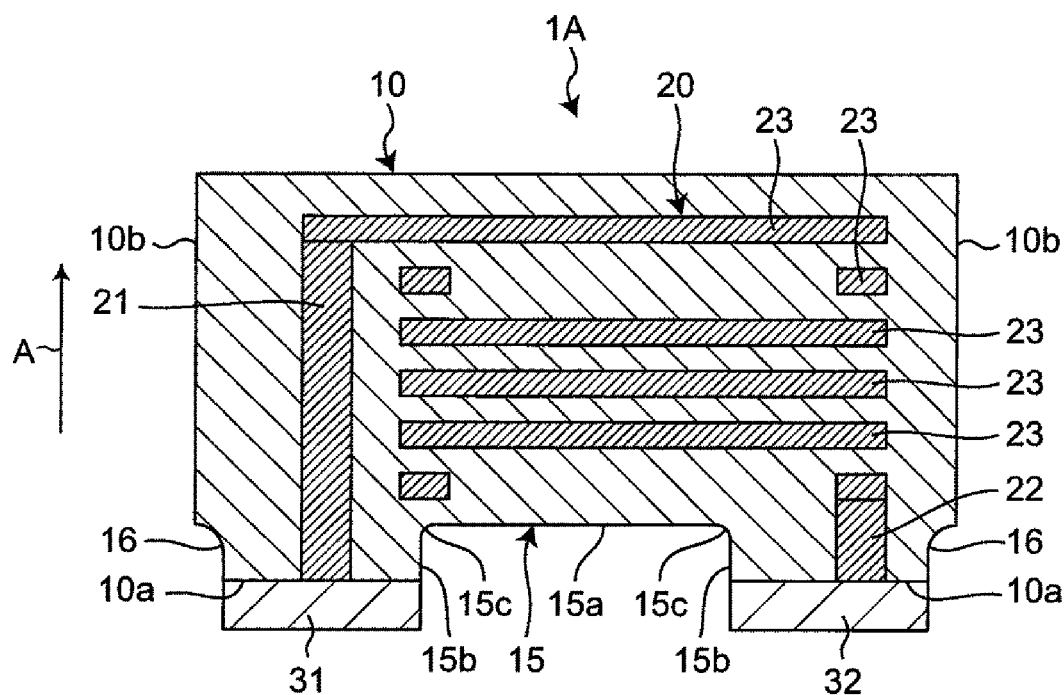
FIG. 3 is a cross-sectional view illustrating a second embodiment of a multilayer electronic component according to the present disclosure.

FIG. 3 is a cross-sectional view illustrating a second embodiment of a multilayer electronic component according to the present disclosure. The second embodiment is different from the first embodiment in the point that cutout grooves are provided. The different configuration will be described below. In the second embodiment, the same reference numerals as those in the first embodiment denote the same components as those in the first embodiment and description thereof is omitted.

As illustrated in FIG. 3, in a multilayer electronic component 1A, cutout grooves 16 are provided in corner portions at which the bottom surface 10a of the multilayer body 10 and the outer surfaces 10b of the multilayer body 10 intersect with each other. The depth of the cutout grooves 16 is substantially the same as the depth of the groove 15.

With the above-described multilayer electronic component 1A, when the multilayer electronic component 1A is mounted on a mounting substrate, if the outer electrodes 31 and 32 of the multilayer electronic component 1A are bonded to the mounting substrate by solder, the solder wets up the cutout grooves 16 and the solder that protrudes to outer side portions relative to the outer surfaces 10b of the multilayer body 10 can be reduced. With this configuration, the mounting area of the multilayer electronic component 1A can be reduced. Next, a method for manufacturing the multilayer electronic component 1A will be described.

The manufacturing method is different from the manufacturing method in the first embodiment in the point that a process (hereinafter, referred to as a cutout groove formation process) of forming the cutout grooves 16 is added. It should be noted that other processes are the same as those in the manufacturing method in the first embodiment and description thereof is omitted.

Figure 4A:
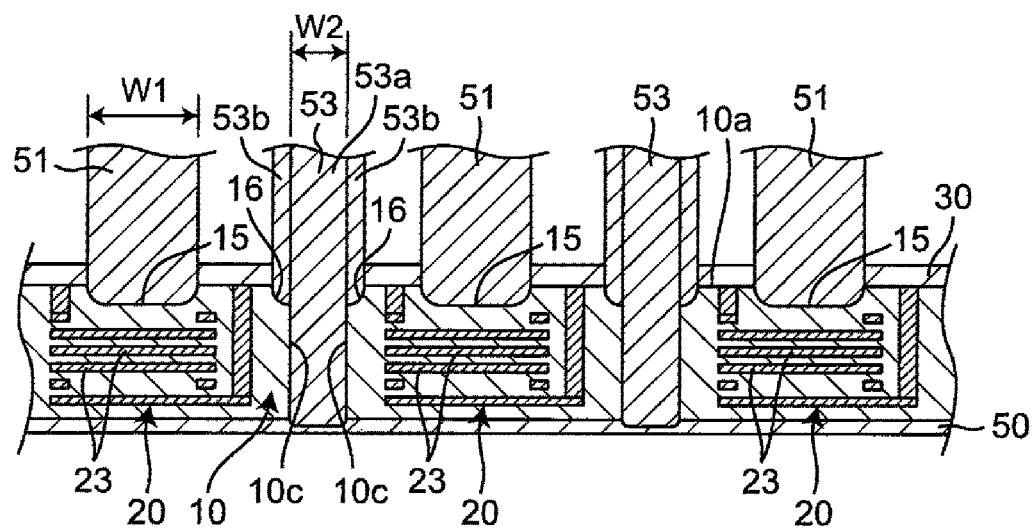
FIG. 4A is a perspective view illustrating the second embodiment of a multilayer electronic component manufacturing method in the present disclosure.
Figure 4B:
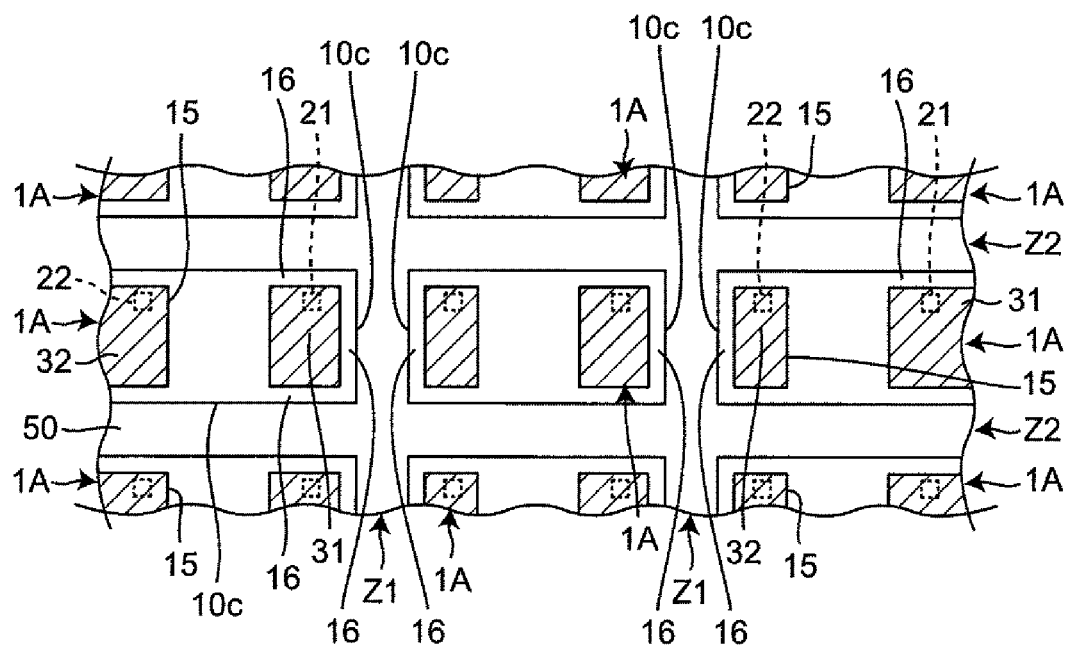
FIG. 4B is a cross-sectional view illustrating the second embodiment of the multilayer electronic component manufacturing method in the present disclosure.

The groove formation process, the segmentation process, and the cutout groove formation process are performed as illustrated in FIG. 4A to form the plurality of multilayer electronic components 1A as illustrated in a plan view in FIG. 4B.

As is described in detail, in the segmentation process, the integrated multilayer body 10 is divided to form divided surfaces 10c on the individual multilayer bodies 10. The divided surfaces 10c are identical to the outer surfaces 10b of the multilayer bodies 10 of the multilayer electronic components 1A. In the cutout groove formation process, the cutout grooves 16 are formed in the corner portions at which the bottom surfaces 10a of the multilayer bodies 10 and the divided surfaces 10c of the multilayer bodies 10 intersect with each other.

Dicer blades are used in the groove formation process, the segmentation process, and the cutout groove formation process. The groove dicer blades 51 are used in the groove formation process, and segmentation and cutout groove dicer blades 53 are used in the segmentation process and the cutout groove formation process. The segmentation and cutout groove dicer blades 53 include segmentation blade portions 53a and cutout groove blade portions 53b.

The groove dicer blades 51 and the segmentation and cut dicer blades 53 simultaneously perform scanning. That is to say, the grooves 15 are formed using the groove dicer blades 51 whereas segmentation and formation of the divided surfaces 10c are performed using the segmentation blade portions 53a and the cutout grooves 16 are formed using the cutout groove blade portions 53b. The regions removed by the segmentation blade portions 53a are assumed to the removal regions Z1 and Z2 in FIG. 4B.

The cutout grooves 16 are formed along the removal regions Z1 and Z2 (divided surfaces 10c). A cut depth in the multilayer bodies 10 by the cutout groove blade portions 53b is substantially the same as a cut depth in the multilayer body 10 by the groove dicer blades 51. The width W2 of the segmentation dicer blades 53a is smaller than the width W1 of the groove dicer blades 51. In FIG. 4B, the bottom surfaces 10a are hatched for illustration.

With the method for manufacturing the multilayer electronic component 1A, the multilayer electronic component 1A in which the cutout grooves 16 are formed in the corner portions at which the bottom surface 10a of the multilayer body 10 and the outer surfaces 10b (divided surfaces) of the multilayer body 10 intersect with each other can be manufactured. Accordingly, when the multilayer electronic component 1A is mounted on a mounting substrate, if the outer electrodes 31 and 32 of the multilayer electronic component 1A are bonded to the mounting substrate by solder, the solder wets up the cutout grooves 16 and the solder that protrudes to outer side portions relative to the outer surfaces 10b of the multilayer body 10 can be reduced. With this configuration, the mounting area of the multilayer electronic component 1A can be reduced.

It should be noted that the cutout groove formation process and the segmentation process may be separately performed. That is to say, the cutout groove formation process is performed before or after the segmentation process. In this case, dicer blades that are used in the cutout groove formation process and dicer blades that are used in the segmentation process can be made different from each other.

Third Embodiment

Figure 5A:
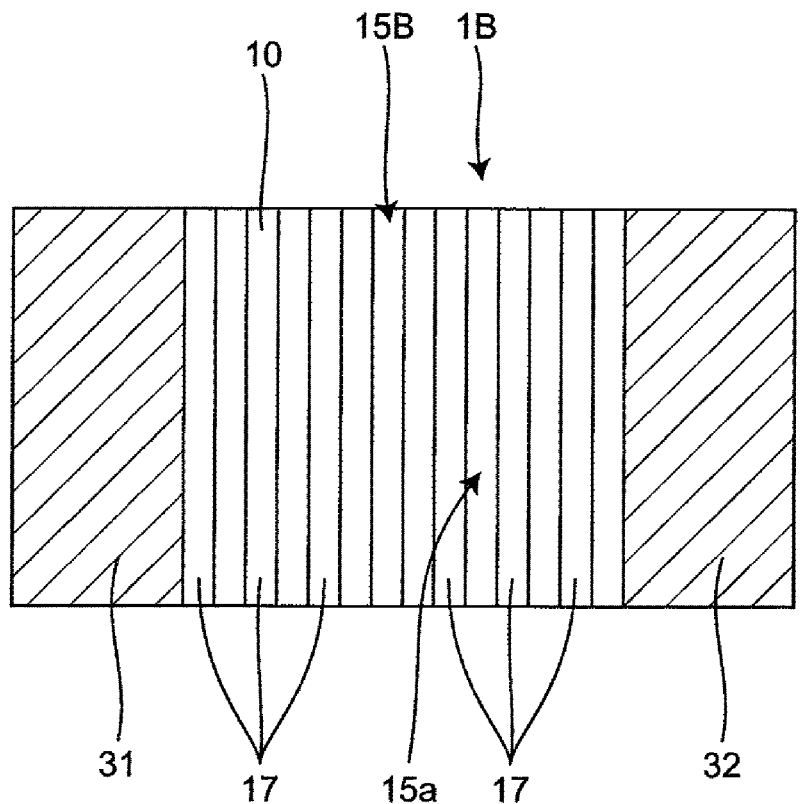
FIG. 5A is a bottom view illustrating a third embodiment of a multilayer electronic component according to the present disclosure.
Figure 5B:
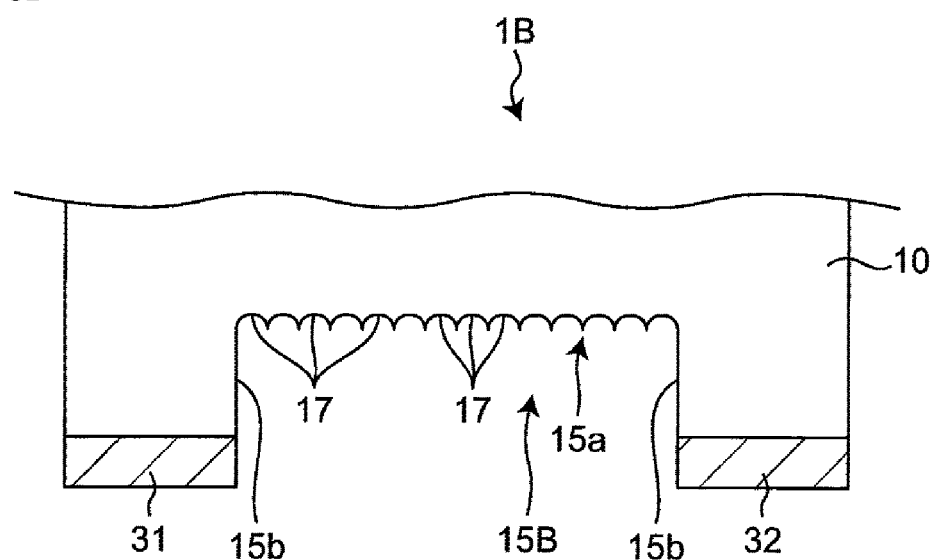
FIG. 5B is a side view illustrating the third embodiment of the multilayer electronic component in the present disclosure.

FIG. 5A is a bottom view illustrating a third embodiment of a multilayer electronic component according to the present disclosure. FIG. 5B is a side view illustrating the third embodiment of the multilayer electronic component in the present disclosure. The third embodiment is different from the first embodiment in a shape of the bottom surface of the groove of the multilayer body. The different configuration will be described below. In the third embodiment, the same reference numerals as those in the first embodiment denote the same components as those in the first embodiment and description thereof is omitted.

As illustrated in FIG. 5A and FIG. 5B, a multilayer electronic component 1B has a plurality of recess portions 17 extending along an extension direction of a groove 15B of the multilayer body 10 in a bottom surface 15a of the groove 15B. The plurality of recess portions 17 are aligned along the width direction of the groove 15B. In other words, linear projections extending along the extension direction of the groove 15B are provided between the adjacent recess portions 17 on the bottom surface 15a of the groove 15B. In FIG. 5A and FIG. 5B, the outer electrodes 31 and 32 are hatched for illustration.

With the multilayer electronic component 1B, when the multilayer electronic component 1B is manufactured, the groove 15B can be formed by forming the plurality of recess portions 17B with a dicer blade while the width of the dicer blade that is used for forming the groove 15B is made smaller than the width of the groove 15B. Accordingly, the dicer blade having a small width can be used.

In a method for manufacturing the multilayer electronic component 1B, the width W1 of the dicer blades that are used in the groove formation process and the width W2 of the dicer blades that are used in the segmentation process may be the same. With this, the dicer blades can be commonly used in the groove formation process and the segmentation process.

The present disclosure is not limited to the above-described embodiments and design can be changed in a range without departing from the gist of the present disclosure. For example, characteristic points in the first to third embodiments may be variously combined.

Although the multilayer electronic component is the inductor component in the above-described embodiments, it may be a capacitor component or a resistor component. Although the multilayer body includes the coil, it may include only the ceramic layers.

Although the grooves are formed by removing some parts of the outer electrode conductor layer and some parts of the bottom surface of the multilayer body in the groove formation process in the above-described embodiments, the grooves may be formed by removing only some parts of the outer electrode conductor layer. In this case, the grooves are not formed in the multilayer body.

Figure 6A:
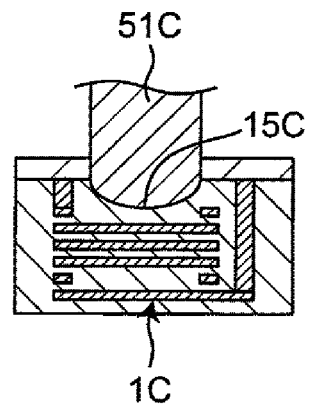
FIG. 6A is a cross-sectional view illustrating another shape of a groove of the multilayer electronic component.
Figure 6B:
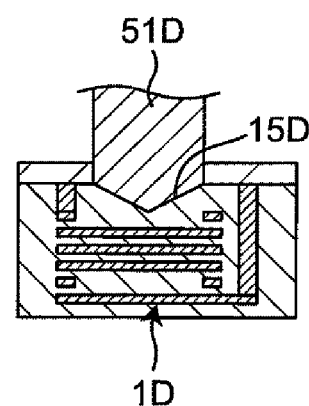
FIG. 6B is a cross-sectional view illustrating still another shape of the groove of the multilayer electronic component.
Figure 6C:
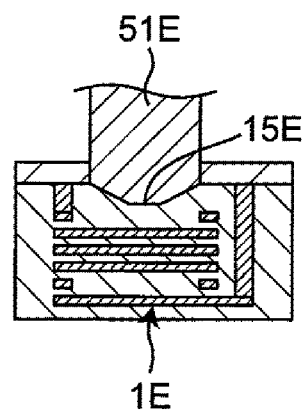
FIG. 6C is a cross-sectional view illustrating still another shape of the groove of the multilayer electronic component.

Although the inner surface of the groove of the multilayer body has the substantially rectangular shape in the above-described embodiments, the shape is not limited thereto. For example, as illustrated in FIG. 6A, the shape of a groove 15C in a multilayer electronic component 1C may be formed into a recessed curved surface that is continuously curved. That is to say, the shape of a front end of a groove dicer blade 51C is formed into a projecting curved surface that is continuously curved. As illustrated in FIG. 6B, a groove 15D in a multilayer electronic component 1D may be formed into a V shape. That is to say, a front end of a groove dicer blade 51D is formed into a V shape. As illustrated in FIG. 6C, a groove 15E in a multilayer electronic component 1E may be formed into an inverted trapezoid shape. That is to say, a front end of a groove dicer blade 51E is formed into an inverted trapezoid shape.

Although the two outer electrodes are provided on the multilayer electronic component in the above-described embodiments, equal to or more than four outer electrodes may be provided.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A multilayer electronic component comprising:
   a multilayer body including a plurality of ceramic layers, and a groove is provided in a bottom surface of the multilayer body;
   an outer electrode provided on the bottom surface of the multilayer body; and
   a spiral coil that is electrically connected to the outer electrode,
   wherein the groove has a bottom surface and side surfaces, the side surfaces extend along an entire width of the bottom surface of the multilayer body, and the bottom surface of the groove extends along an entire bottom surface of the multilayer body between the side surfaces.

2. The multilayer electronic component according to claim 1, wherein a cutout groove is provided in a corner portion at which the bottom surface of the multilayer body and an outer surface of the multilayer body intersect with each other.

3. The multilayer electronic component according to claim 1, wherein the bottom surface of the groove has a plurality of recess portions extending along an extension direction of the groove.

4. The multilayer electronic component according to claim 1, wherein the outer electrode is provided along the entire bottom surface of the multilayer body in a width direction.

5. The multilayer electronic component according to claim 1,
   wherein an inner surface of the groove has connection portions that are formed into recessed curved surfaces between the bottom surface and the side surfaces.

6. The multilayer electronic component according to claim 5, wherein
   the multilayer body has a plurality of coil patterns provided between the plurality of ceramic layers; and
   the plurality of coil patterns are electrically connected to each other to configure the spiral coil.

7. The multilayer electronic component according to claim 5, wherein a cutout groove is provided in a corner portion at which the bottom surface of the multilayer body and an outer surface of the multilayer body intersect with each other.

8. The multilayer electronic component according to claim 1, wherein
   the multilayer body has a plurality of coil patterns provided between the plurality of ceramic layers; and
   the plurality of coil patterns are electrically connected to each other to configure the spiral coil.

9. The multilayer electronic component according to claim 8, wherein a lamination direction of the plurality of ceramic layers is a direction that is orthogonal to the bottom surface of the multilayer body; and
   an axis of the spiral coil is orthogonal to the bottom surface of the multilayer body.

10. The multilayer electronic component according to claim 8, wherein
    a lamination direction of the plurality of ceramic layers is a direction that is orthogonal to the bottom surface of the multilayer body; and
    an axis of the spiral coil is in parallel with the bottom surface of the multilayer body.

* * * * *